US006658474B2

United States Patent
Kang

(10) Patent No.: US 6,658,474 B2
(45) Date of Patent: Dec. 2, 2003

(54) HOME NETWORK SYSTEM AND METHOD OF ALLOCATING NODE IDENTIFICATION

(75) Inventor: Sung-bong Kang, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/448,993

(22) Filed: Nov. 24, 1999

(65) Prior Publication Data

US 2003/0074450 A1 Apr. 17, 2003

(30) Foreign Application Priority Data

Nov. 26, 1998 (KR) .............................. 98-50942

(51) Int. Cl.⁷ .............................................. G06F 15/16
(52) U.S. Cl. ..................... 709/227; 709/209; 709/220; 370/254; 370/389
(58) Field of Search ........................... 709/200, 2, 209, 709/301, 238, 805, 253, 226, 220, 221, 222, 227; 370/257, 254, 389, 390

(56) References Cited

U.S. PATENT DOCUMENTS

| | | | | |
|---|---|---|---|---|
| 5,919,258 A | * | 7/1999 | Kayashima et al. | 713/201 |
| 6,026,150 A | * | 2/2000 | Frank et al. | 379/90.01 |
| 6,052,750 A | * | 4/2000 | Lea | 710/72 |
| 6,085,236 A | * | 7/2000 | Lea | 709/220 |
| 6,160,796 A | * | 12/2000 | Zou | 370/257 |
| 6,199,136 B1 | * | 3/2001 | Shteyn | 370/260 |
| 6,259,707 B1 | * | 7/2001 | Dara-Abrams et al. | 370/486 |
| 6,288,716 B1 | * | 9/2001 | Humpleman et al. | 345/733 |
| 6,314,459 B1 | * | 11/2001 | Freeman | 709/220 |
| 6,456,892 B1 | * | 9/2002 | Dara-Abrams et al. | 700/83 |

FOREIGN PATENT DOCUMENTS

| | | | | |
|---|---|---|---|---|
| EP | WO 94 27398 A | 11/1994 | | |
| EP | WO 98 16077 A | 4/1998 | | |
| JP | 2 167 274 A | 5/1986 | ........... H04L/11/16 |
| JP | 4-78246 | 3/1992 | ........... H04L/12/40 |
| JP | 4078246 | 3/1992 | | |
| JP | 2 251 532 A | 7/1992 | ........... H04L/12/40 |
| JP | 7-131470 | 5/1995 | ........... H04L/12/40 |
| JP | 7-250070 | 9/1995 | ........... H04L/12/28 |
| JP | 8-18584 | 1/1996 | ........... H04L/12/40 |
| JP | 8204731 | 8/1996 | | |
| JP | 8-204731 | 8/1996 | ........... H04L/12/40 |
| JP | 10-55232 | 2/1998 | ............. G06F/3/00 |
| JP | 11-275117 | 10/1999 | ........... H04L/12/40 |
| JP | 2000-13399 | 1/2000 | ........... H04L/12/28 |
| JP | 2000-124928 | 4/2000 | ........... H04L/12/40 |
| JP | 2000-134264 | 5/2000 | ........... H04L/12/56 |

OTHER PUBLICATIONS

IEEE Standard for a High Performance Serial Bus, Aug. 30, 1996.

* cited by examiner

*Primary Examiner*—David Wiley
*Assistant Examiner*—Phuoc H. Nguyen
(74) *Attorney, Agent, or Firm*—Sughrue Mion, PLLC

(57) ABSTRACT

A home network system and a node ID allocating method performed in the home network system are provided. The home network system comprises a root device, leaf devices, and an IEEE 1394 bus connecting the root device and leaf devices. The root device acts as a bus master for controlling or managing the flow of data on the IEEE 1394 bus among the leaf devices. The root device stores and manages information relating to node identifications (IDs) allocated to each of the leaf devices immediately after the initialization of the home network system. Also, the root device allocates a number, which has not been used by the leaf devices, as the node ID of a new device connected to the home network. In this method, when a leaf device is added to the network, the root device assigns an unused a node value to the new device. On the other hand, when an existing device is removed from the network, the root device broadcasts information about the node ID of the removed device to the other leaf devices. In this way, the home network system maintains normal operation without being reset when a device is added to or removed from the network, and thus, the loss of data and the malfunction of the leaf devices are prevented.

43 Claims, 4 Drawing Sheets

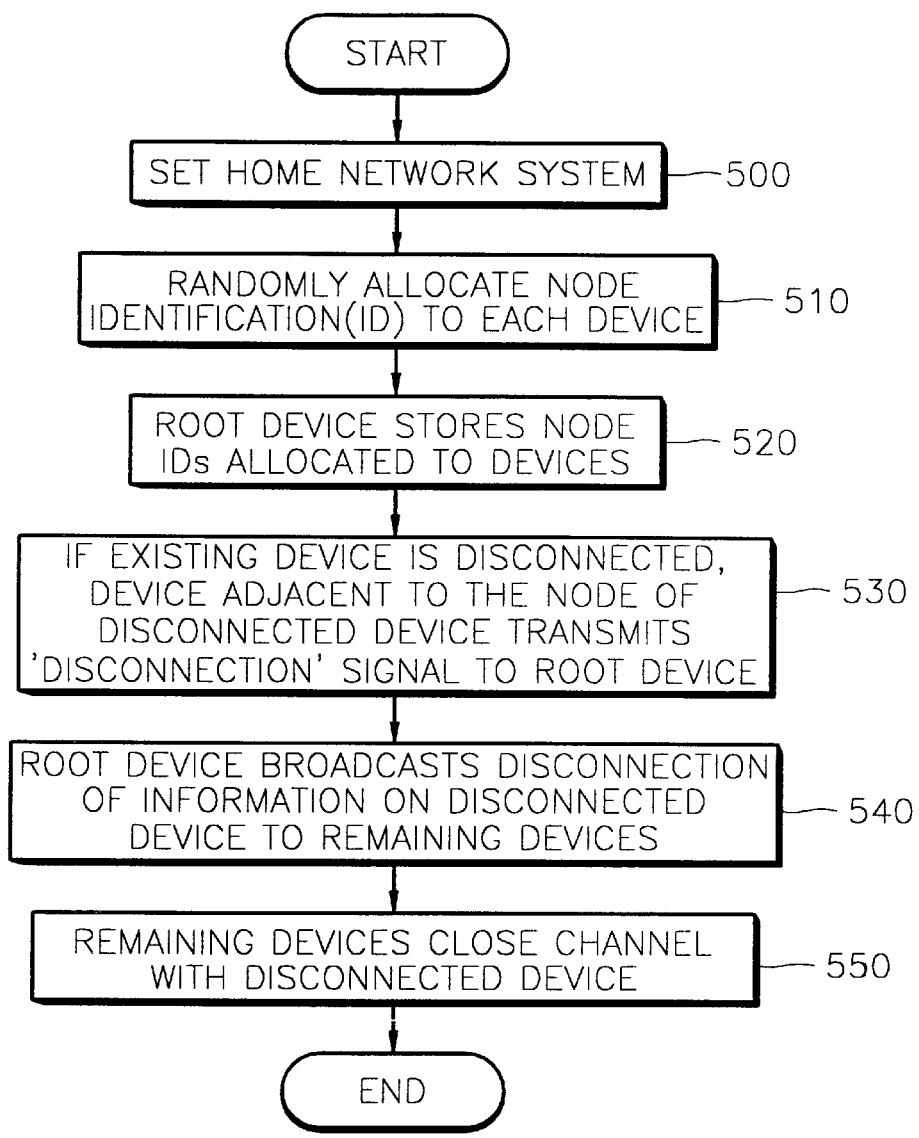

HOME NETWORK SYSTEM AND METHOD OF ALLOCATING NODE IDENTIFICATION

BACKGROUND OF THE INVENTION

1. Field of the Invention

The present invention relates to a method of allocating an identification (ID) to each node of a home network system. More particularly, the present invention relates to a home network system in which nodes are connected together via an IEEE 1394 bus and in which node IDs can be allocated without resetting the bus when a node is added to or removed from the home network system. The present invention also relates to a method of allocating node IDs in the home network system.

2. Description of the Related Art

In home network systems, home-use devices are interconnected via a network, and various signals are exchanged among the devices. In addition, a predetermined device is used to control the operations of the home-use device and the signals exchanged among the devices. Recently, an IEEE 1394 bus has been used in the home networks to interconnect the various devices.

FIG. 1 shows an example of a general home network system. As illustrated in the figure, the system contains a root 100, a first leaf 110, a second leaf 120, a third leaf 130, a fourth leaf 140, and a fifth leaf 150 that are interconnected via an IEEE 1394 bus. The root 100 and various leaves 110, 120, 130, 140, and 150 represent various appliances or devices in the network, and the appliance corresponding to the root 100 acts as a bus master for controlling and monitoring the exchange of signals on the IEEE 1394 bus.

When the home network system is configured, an address or identification (ID) is allocated to each of the devices. Accordingly, processing the signals exchanged via the network is facilitated because the IDs clarify the source and destination of a signals. The address or ID is typically referred to as a node ID.

FIG. 2 shows the flowchart of a conventional method of setting the node IDs in a home network system. Specifically, when a home network system is configured for the first time or the configuration of the system is modified, the IEEE 1394 bus connecting the network is reset. (Step 200). After the bus is reset, when any one of the devices (i.e. the root 100 or one of the leaves 110, 120, 130, 140, and 150) requests an address, the first node ID is assigned to the device. (Step 210). The node IDs are not allocated to the devices in accordance with a predetermined order of allocation, and the first node ID is allocated to the device that first requests an address, regardless of which device 100, 110, 120, 130, 140, or 150 first requests the node ID. Afterwards, as the remaining devices 100, 110, 120, 130, 140, or 150 randomly request node IDs, the node IDs are sequentially assigned to the devices based on the order in which the devices make the requests. In other words, in step 210, if the device 130 is the first device to request a node ID, the device 130 will be assigned the first node ID. Then, in step 220, if the devices 110, 150, 100, 120, and 140 sequentially request node IDs, the second, third, fourth, fifth, and sixth node IDs will be assigned to the devices 110, 150, 100, 120, and 140, respectively.

Then, then method determines if a new device is connected to the home system network or if an existing device is removed from the network after the node IDs have been completely allocated. (Step 230). If a new device is not connected to the system or an existing device is not removed, the process ends. On the other hand, if a device is connected to or removed from the network, the IEEE 1394 bus is completely reset, regardless of whether or not data is being transmitted on the home network. (Step 240). When, the home network system is reset, the data transmission and the operation of the devices in the home network system are also reset. After resetting the bus, the process returns to step 210 and the node IDs are reallocated.

As described above, whenever the configuration of the conventional home network system is changed (i.e. when a new device is added or an existing device is removed), the data transmission on the IEEE 1394 bus stops and the operation of the devices stops. As a result, reconfiguring the home network system is very disruptive to the operation of the system.

SUMMARY OF THE INVENTION

An object of the present invention is to provide a home network system in which node IDs can be allocated while the system normally operates without being reset, even when an device is added to or removed from the home network system Another object of the present invention is to provide a method of allocating node IDs in the home network system.

In order to achieve the above and other objects, a method of allocating node identifications (IDs) in a home network system is provided. In the home network system, a root device and a first device are interconnected via a network, and the method comprises: (a) assigning a first node ID to said first device and sending said first node ID from said root device to said first device; (b) storing, in said root device, node information relating to said first node ID being assigned to said first device; (c) connecting a new device to said network after storing said node information relating to said first node ID; (d) sending connection information from said new device to said root device to inform said root device that said new device has been connected to said network; (e) assigning a new node ID to said new device and sending said new node ID from said root device to said new device without resetting said home network system; and (f) storing, in said root device, node information relating to said new node ID being assigned to said new device.

In order to further achieve the above and other objects, a method of allocating node identifications (IDs) in a home network system is provided. In the home network system, a root device, a first device, and a second device are interconnected via a network, and the method comprises: (a) assigning a first node ID to said first device, sending said first node ID from said root device to said first device, assigning a second node ID to said second device, and sending said second node ID from said root device to said second device. (b) storing, in said root device, node information relating to said first node ID being assigned to said first device and said second node ID being assigned to said second device; (c) disconnecting said second device from said network after storing said node information relating to said first node ID and said second node ID; (d) sending a disconnection signal from said first device to said root device to inform said root device that said second device has been disconnected from said network.

In order to even further achieve the above and other objects, a home network system is provided. The home network system comprises: a root device connected to a network; a first node ID connected to said network, wherein said root device assigns a first node ID to said first device and sends said first node ID to said first device, wherein said root device stores node information relating to said first node ID being assigned to said first device; and a new device that is connected to said network after said root device stores said node information relating to said first node ID, wherein said new device sends connection information to said root device to inform said root device that said new device has been connected to said network, wherein said root device assigns a new node ID to said new device without resetting said home network system and sends said new node ID to said new device, and wherein said root device stores node information relating to said new node ID.

In order to yet further achieve the above and other objects, a home network system a home network system is provided. The home network system, comprises: a root device connected to a network, a first device connected to said network, and a second device connected to said network, wherein said root system assigns a first node ID to said first device, sends said first node ID to said first device, assigns a second node ID to said second device, and sends said second node ID to said second device, wherein said root device stores node information relating to said first node ID being assigned to said first device and said second node ID being assigned to said second device, wherein said second device is disconnected from said network after said node information relating to said first node ID and said second node ID is stored, and wherein said first device sends a disconnection signal to said root device to inform said root device that said second device has been disconnected from said network.

BRIEF DESCRIPTION OF THE DRAWINGS

The above and other objects and advantages of the present invention will become more apparent by describing in detail preferred embodiments thereof with reference to the attached drawings in which:

FIG. 5 is a flowchart illustrating a second embodiment of a method of setting node IDs in the home network system according to the present invention.

DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

Figure 1:
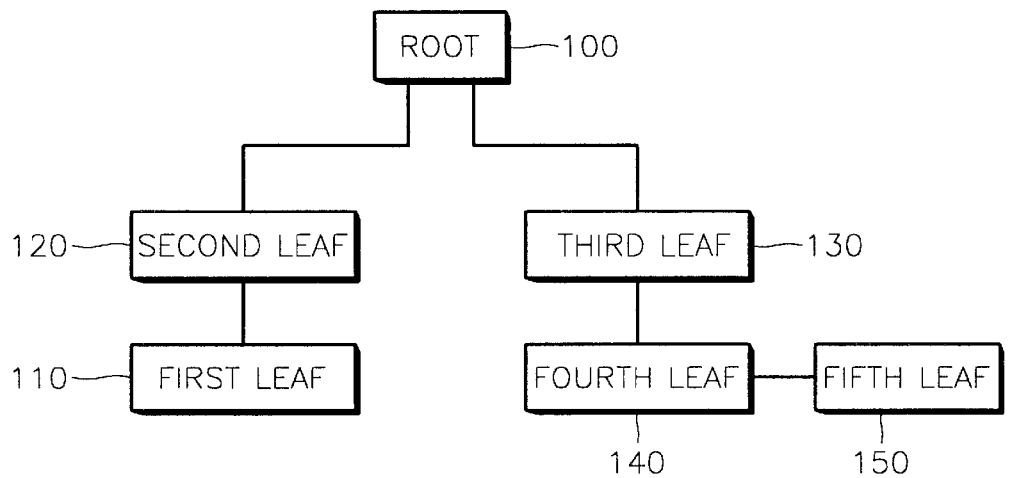
FIG. 1 is a block diagram illustrating the configuration of a general home network.
Figure 2:
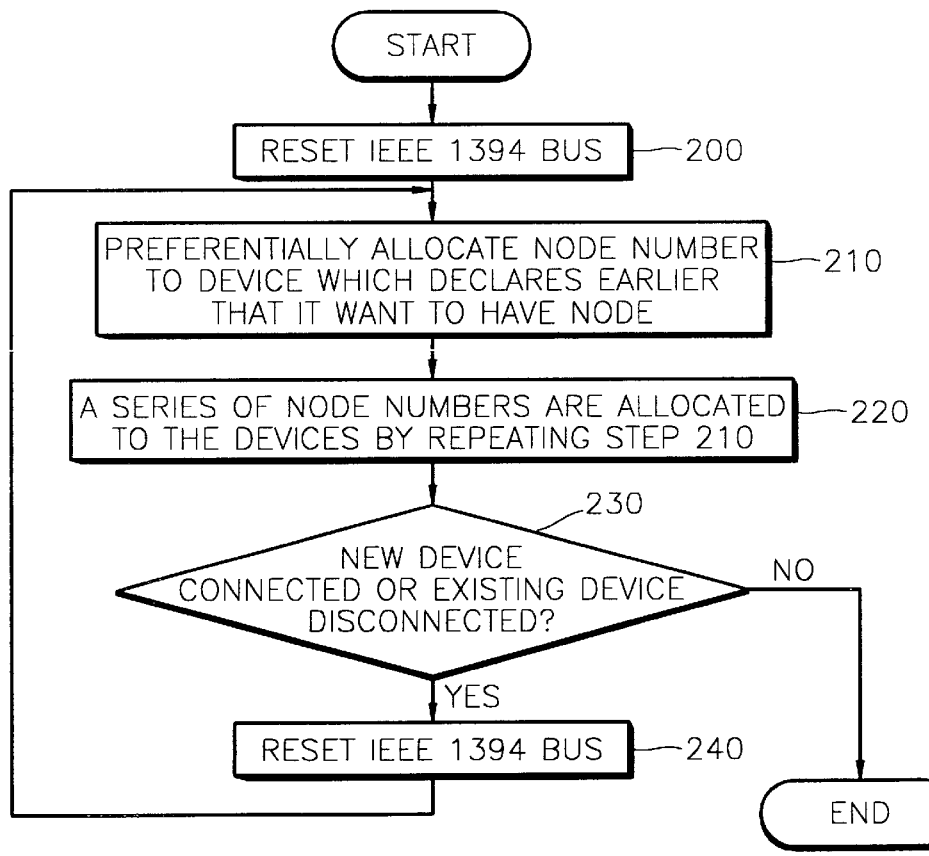
FIG. 2 is a flowchart illustrating a conventional method of setting node IDs.
Figure 3:
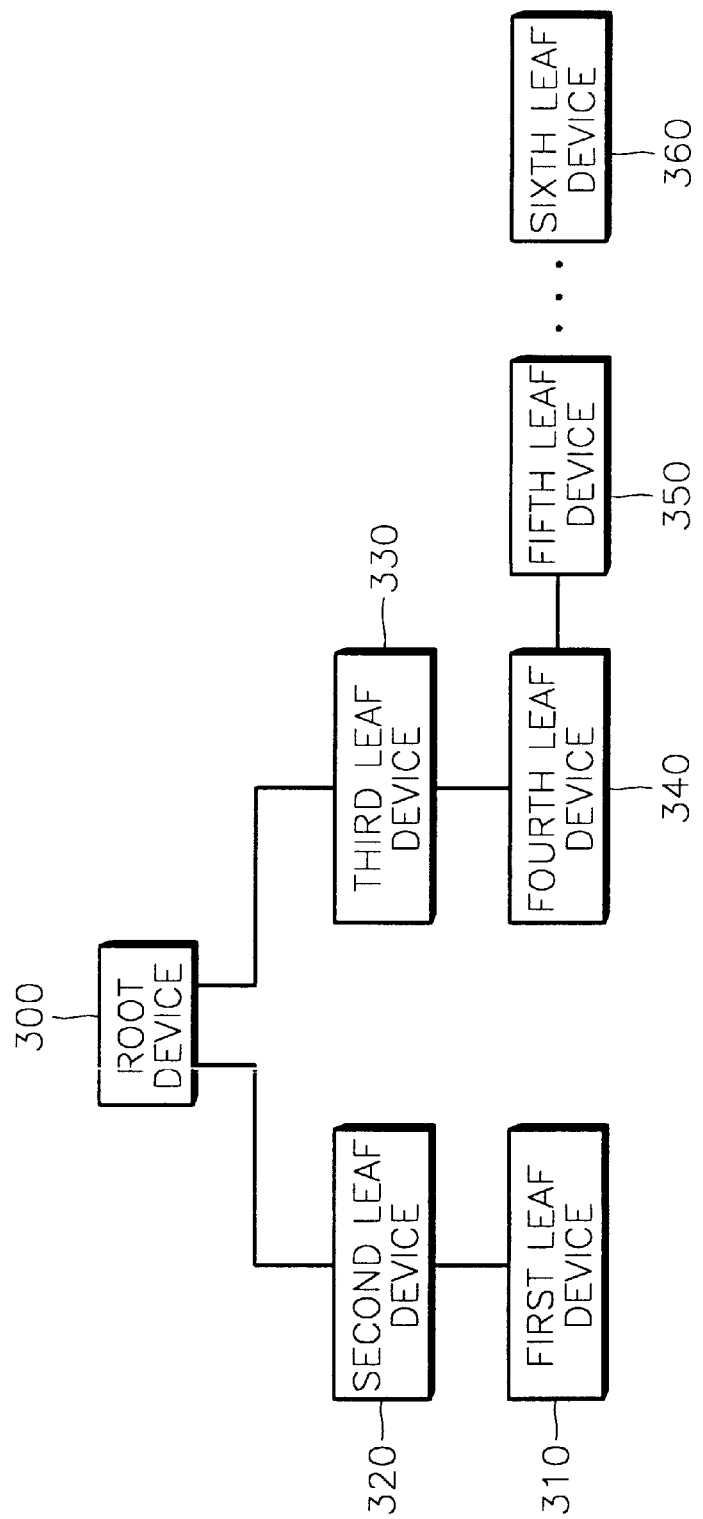
FIG. 3 is a block diagram of an embodiment of a home network system according to the present invention.

FIG. 3 illustrates a home network system according to an illustrative embodiment of the present invention. As shown in the figure, the system comprises a root device 300, a first leaf device 310, a second leaf device 320, a third leaf device 330, a fourth leaf device 340, a fifth leaf device 350, and a sixth leaf device 360. The root device 300 and the first to fifth leaf devices 310 to 350 are interconnected by an IEEE 1394 bus. Also, the sixth leaf device is a new device that is being connected to the network or an existing device that is being removed from the network.

The root device 300 and the first to sixth leaf devices 310 through 360 correspond to various home appliances. In a preferred embodiment, the devices 300 to 360 correspond to digital home appliances such as a digital TV, a digital VCR, a camcorder, a set top box, or similar appliance. These devices 300 to 360 form a home network and exchange signals with each other so that one or more of the devices can control the other devices, display information about the other devices, and/or monitor the operations of the other devices. These devices 300 to 260 preferably exchange signals in accordance with an IEEE 1394 protocol.

When one device transmits a predetermined signal to (or receives a signal from) one of the other devices on the home network, the device to which the signal is transmitted (or the device from which the signal is received) must be identified. In order to properly and accurately identify the devices, each of the devices has its own node ID. The node ID is randomly determined for each of the devices immediately after a home network is established and operated for the first time. For example, when various devices are interconnected in the home network system, the node IDs "0" through "62" are available to be assigned to the devices. Since 63 node IDs are available (i.e. node ID "0" to node ID "62"), the maximum number of devices that can be connected to the home network system is to 63. Clearly, if the number of available node IDs is increased, the maximum number of devices that can be connected to the network would also increase.

The node IDs are assigned to the various devices 300 to 350 in ascending order or descending order. When the node IDs are assigned to the devices 300 to 350 in ascending order, the node ID of the root device 300 is zero. In addition, the node IDs may be sequentially assigned to the leaf devices 310 to 350 based on the order of the devices 310 to 350 such that the devices 310 to 350 are assigned the node IDs "1" to "5", respectively. Alternatively, the node IDs may be sequentially assigned to the leaf devices 310 to 350 based on the order in which the devices 310 to 350 request a node ID. In such case, if the devices 310, 340, 350, 330, and 320 sequentially request node IDs, the devices 310, 340, 350, 330, and 320 are respectively assigned the node IDs "1" to "5". Conversely, when the node IDs are assigned to the devices 300 to 350 in descending order, the node ID of the root device 300 is "62". In addition, the node IDs may be sequentially assigned to the leaf devices 310 to 350 based on the order of the devices 310 to 350 such that the devices 310 to 350 are assigned the node IDs "61" to "57", respectively. Alternatively, the node IDs may be sequentially assigned to the leaf devices 310 to 350 based on the order in which the devices 310 to 350 request a node ID. In such case, if the devices 310, 340, 350, 330, and 320 sequentially request node IDs, the devices 310, 340, 350, 330, and 320 are respectively assigned the node IDs "61" to "57". When the node IDs are assigned, the root device 300 stores its own node ID, the node IDs of the leaf devices 310 through 350, and information relating to the allocation of the node IDs.

After the network has been formed with the root device 300 and the leaf devices 310 to 350 and has begun operating, a sixth leaf device 360 may be connected to the home network system. In such case, the root device 300 assigns a node ID to the leaf device 360 that succeeds the node IDs already assigned to the devices 310 to 350 and that is not currently used. After receiving the node ID, the sixth leaf device 360 broadcasts its node ID to the other devices 300 to 350. In addition, the sixth leaf device 360 broadcasts other information such as the device type of the sixth leaf device 360, the manufacturer of the sixth leaf device 360, etc. Based on the broadcast information, the other devices 300 to 350 recognize and register the node ID, device type, manufacturer, etc. of the sixth leaf device 360, and a signal transmission channel is established between the sixth leaf device 360 and each of the leaf devices 300 through 350.

Figure 4:
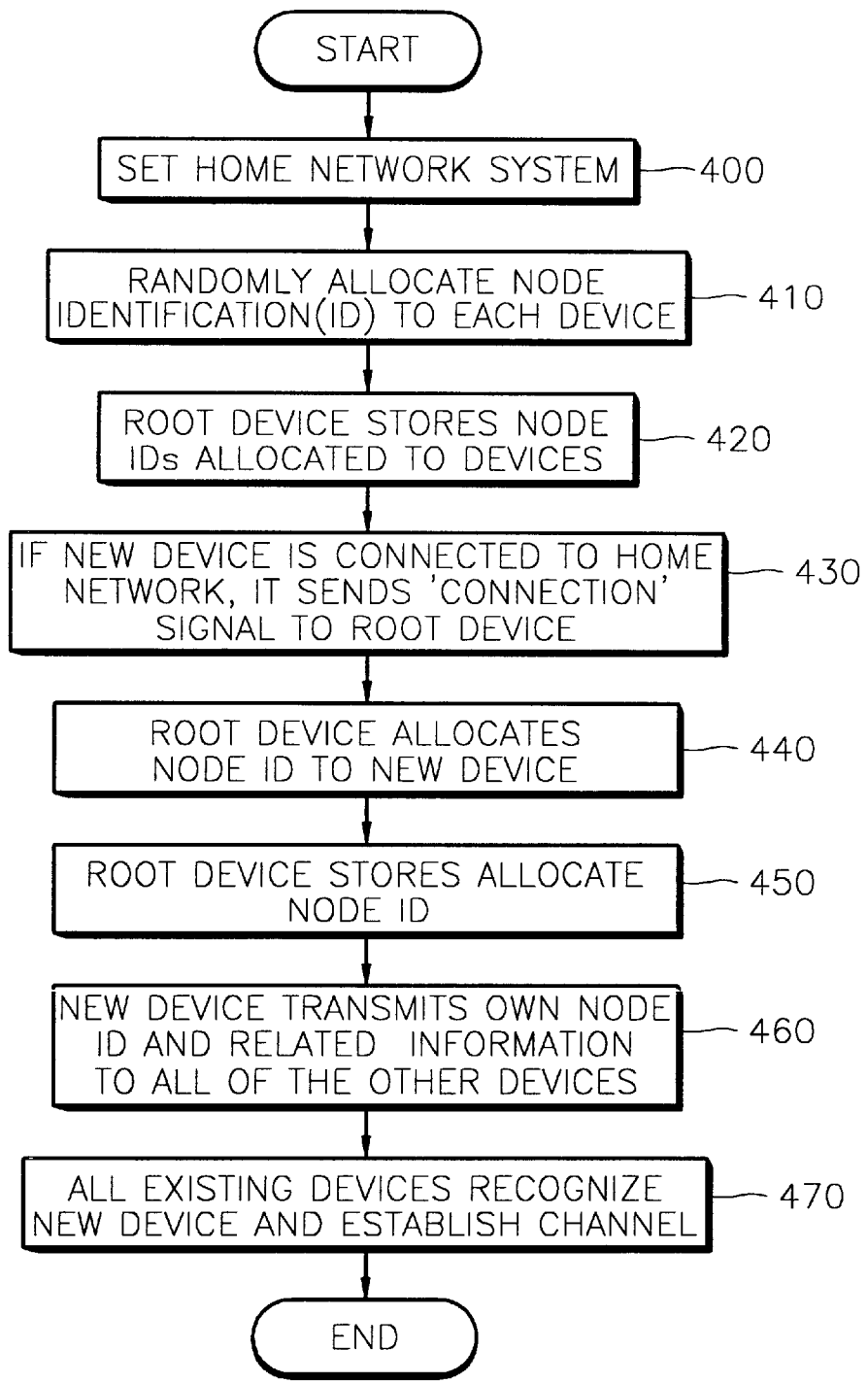
FIG. 4 is a flowchart illustrating a first embodiment of a method of setting node IDs in the home network system according to the present invention.

FIG. 4 is a flowchart illustrating a first embodiment of a method for allocating a node ID in the home network system shown in FIG. 3. In the method, immediately after the home network system is initially set up to operate for the first time (step 400), a node ID is sequentially allocated to each of the devices 300 through 350 contained in the home network in one of the manners described above. For example, the root device 300 may be assigned the first node ID, and the first to sixth node IDs may be sequentially allocated to the devices 310 to 350, beginning with a device that randomly happens to be the first device to react on the IEEE 1394 bus or request a node ID. (Step 410). In a preferred embodiment, the node ID of each device sequentially succeeds the node ID of the device that was last assigned a node ID. As described above, the node IDs may be assigned in an ascending or descending order. When all of the devices 300 to 360 have node IDs, the root device 300, which manages the flow of signals on the IEEE 1394 bus, stores the node ID of each of the devices 310 to 360. (Step 420).

After the home network system begins operating and a new device 360 is connected to the network system, the new device 360 sends a signal to the root device 300 that informs the root device 300 that it is connected to the system. (Step 430). In addition, the new device may also broadcast such information to the other devices 310 to 350 in the network. After the root device 300 receives the signal from the sixth leaf device 360, it assigns the device 360 a node ID that is not the same as the node IDs currently used by the devices 310 to 350. (Step 440). Then, the root device 300 stores the node ID of the new device 360 as a node ID number that is currently being used. (Step 450).

After the new device 360 is assigned the node ID, it sends a broadcast message to the other devices 300 through 350. The broadcast message has a predetermined format and includes the node ID of the device 360, the device type of the device 360, the manufacturer of the device 360, etc. (Step 460). As a result, the various devices 300 to 350 connected to the home network system recognize the new device 360, and a signal transmission channel is established between the new device 360 and each of the existing devices 300 to 350. (Step 470).

As described above, the method assigns a node ID to a new device without resetting the home network system when a new device is connected to the system. Furthermore, when an existing device is disconnected from the network, the root device 300 broadcasts the node ID of the disconnected device to the other devices without resetting the system. As a result, the other devices on the network can be notified of the disconnected device while continuing to transmit signals among each other.

FIG. 5 is a flowchart illustrating a second embodiment of a method for allocating a node ID in the home network system shown in FIG. 3. In contrast with the method illustrated in FIG. 4, in which a new device is added to the home network system, FIG. 5 illustrates a method that is performed when an existing device is disconnected from the home network system. In FIG. 5, steps 500 to 520 are the same as the steps 400 to 420 of FIG. 4, and therefore, they will not be described in detail for the sake of brevity.

When an existing device 360 is disconnected from the home network system after step 520, a device that is adjacent to the disconnected device 360 transmits a signal to the root device 300 that informs the root device 300 that the device 360 has been disconnected. (Step 530). Afterwards, the root device 300 broadcasts a message informing the other devices 310 to 350 connected to the network that the device 360 has been disconnected. The broadcast message contains the node ID of the disconnected device 360. (Step 540). After receiving the broadcast message from the root device 300, the other devices 310 to 350 connected to the home network system close the signal transmission channels with the disconnected device 360 to prevent signals from being transmitted to the disconnected device. (Step 550).

As described above, when a device is added to a home network system containing a IEEE 1394 bus, a root device controlling the IEEE 1394 bus assigns a node ID to the new device. On the other hand, when a device is removed from the home network system, the root device broadcasts information regarding the node ID of the removed device. As a result, the home network system maintains normal operation when a device is added to or removed from the system, and the system does not need to be reset. Thus, no data is lost and the system does not malfunction when devices are added or removed.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. A method of allocating node identifications (IDs) in a home network system in which a root device, a first device and a second device are interconnected via a network bus, comprising:

(a) assigning a first node ID to said first device and sending said first node ID from said root device to said first device;

(b) storing, in said root device, node information relating to said first node ID being assigned to said first device;

(c) connecting a new device to said network after storing said node information relating to said first node ID;

(d) sending connection information from said new device to said root device to inform said root device that said new device has been connected to said network;

(e) assigning a new node ID to said new device and sending said new node ID from said root device to said new device without resetting said network bus;

(f) storing, in said root device, node information relating to said new node ID being assigned to said new device; and (g) transmitting a recognition signal comprising said new node ID from said new device to said first device and said second device.

2. The method as claimed in claim 1, further comprising:
(h) having said first device recognize said new device based on said recognition signal and establishing a signal transmission channel with said new device.

3. The method as claimed in claim 2, wherein said recognition signal transmitted in said step (g) comprises a device type of said new device and a device manufacturer of said new device.

4. The method as claimed in claim 1, wherein said step (a) comprises:
(a1) assigning a first node ID to said first device and sending said first node ID from said root device to said first device; and
(a2) assigning a second node ID to a second device connected to said network and sending said second node ID to said second device,
wherein said first node ID and said second node ID are sequential node addresses and are respectively assigned to said first device and said second device depending on an order in which said first device and second device request node IDs.

5. The method as claimed in claim 4, wherein said step (a) is performed substantially immediately after said home network system is initialized.

6. The method as claimed in claim 1, wherein said connection information sent in said step (d) comprises a device type of said new device and a device manufacturer of said new device.

7. The method as claimed in claim 1, wherein said root device and said first device are interconnected in said network via an IEEE 1394 bus.

8. A method of allocating node identifications (IDs) in a home network system in which a root device, a first device, and a second device are interconnected via a network bus, comprising:
(a) assigning a first node ID to said first device, sending said first node ID from said root device to said first device, assigning a second node ID to said second device, and sending said second node ID from said root device to said second device, wherein said first node ID and said second node ID are sequential node addresses and are respectively assigned to said first device and said second device depending on an order in which said first device and second device request node IDs;
(b) storing, in said root device, node information relating to said first node ID being assigned to said first device and said second node ID being assigned to said second device;
(c) connecting a new device to said home network system after storing said node information relating to said first node ID and said second node ID;
(d) sending connection information from said new device to said root device to inform said root device that said new device has been connected to said network;
(e) assigning a new node ID to said new device and sending said new node ID from said root device to said new device without resetting said network bus;
(f) storing, in said root device, node information relating to said new node ID being assigned to said new device;
(g) transmitting a recognition signal comprising said new node ID from said new device to said first device and said second device after said step (e).

9. The method as claimed in claim 8, further comprising:
(h) having said first device and said second device recognize said new device based on said recognition signal and establishing signal transmission channels among said first device, said second device, and said new device.

10. The method as claimed in claim 9, wherein said connection information sent in said step (d) comprises a device type of said new device and a device manufacturer of said new device.

11. The method as claimed in claim 9, wherein said recognition signal transmitted in said step (g) comprises a device type of said new device and a device manufacturer of said new device.

12. A method of allocating node identifications (IDs) in a home network system in which a root device, a first device, and a second device are interconnected via a network, comprising:
(a) assigning a first node ID to said first device, sending said first node ID from said root device to said first device, assigning a second node ID to said second device, and sending said second node ID from said root device to said second device.
(b) storing, in said root device, node information relating to said first node ID being assigned to said first device and said second node ID being assigned to said second device;
(c) disconnecting said second device from said network after storing said node information relating to said first node ID and said second node ID;
(d) sending a disconnection signal from said first device to said root device to inform said root device that said second device has been disconnected from said network.

13. The method as claimed in claim 12, wherein said step (a) comprises:
(a1) assigning a third node ID to a third device connected to said network and sending said third node ID from said root device to said third device.

14. The method as claimed in claim 13, wherein said first node ID, said second node ID, and said third node ID are sequential node addresses and are respectively assigned to said first device, said second device, and said third device depending on an order in which said first device, said second device, and said third device request node IDs.

15. The method as claimed in claim 13, wherein said step (a) is performed substantially immediately after said home network system is initialized.

16. The method as claimed in claim 13, wherein said first device is located adjacent to said second device before said second device is disconnected from said network and wherein said first device sends said disconnection signal to said root device because said first device is located adjacent to said second device before said second device is disconnected.

17. The method as claimed in claim 13, further comprising:
(e) transmitting a disconnection notification signal from said root device to at least said third device to inform at least said third device that said second device has been disconnected from said network.

18. The method as claimed in claim 17, wherein said disconnection notification signal comprises said second node ID.

19. The method as claimed in claim 17, further comprising:
(f) closing a signal transmission channel from at least said third device to said second device based on said disconnection notification signal.

20. A method of allocating node identifications (IDs) in a home network system in which a root device, a first device, a second device, and a third device are interconnected via a network, comprising:

(a) assigning a first node ID to said first device, sending said first node ID from said root device to said first device, assigning a second node ID to said second device, sending said second node ID from said root device to said second device, assigning a third node ID to said third device, and sending said third node ID from said root device to said third device.

(b) storing, in said root device, node information relating to said first node ID being assigned to said first device, said second node ID being assigned to said second device, and said third node ID being assigned to said third device;

(c) disconnecting said second device from said home network system after storing said node information relating to said first node ID, said second node ID, and said third node ID;

(d) sending a disconnection signal from said first device to said root device to inform said root device that said second device has been disconnected from said network, wherein said first device is located adjacent to said second device before said second device is disconnected from said network and wherein said first device sends said disconnection signal to said root device because said first device is located adjacent to said second device before said second device is disconnected;

(e) transmitting a disconnection notification signal from said root device to at least said third device to inform at least said third device that said second device has been disconnected from said network; and (f) closing a signal transmission channel from at least said third device to said second device based on said disconnection notification signal.

21. The method as claimed in claim 20, wherein said first node ID, said second node ID, and said third node ID are sequential node addresses and are respectively assigned to said first device, said second device, and said third device depending on an order in which said first device, said second device, and said third device request node IDs.

22. The method as claimed in claim 20, wherein said step (a) is performed substantially immediately after said home network system is initialized.

23. The method as claimed in claim 20, wherein said disconnection notification signal comprises said second node ID.

24. A home network system, comprising:

a root device connected to a network via a network bus;

a first device and a second device connected to said network, wherein said root device assigns a first node ID to said first device and sends said first node ID to said first device, wherein said root device stores node information relating to said first node ID being assigned to said first device; and a new device that is connected to said network after said root device stores said node information relating to said first node ID, wherein said new device sends connection information to said root device to inform said root device that said new device has been connected to said network, wherein said root device assigns a new node ID to said new device without resetting said network bus and sends said new node ID to said new device, and wherein said root device stores node information relating to said new node ID, and wherein said new device transmits a recognition signal comprising said new node ID to said first device and to said second device after said new device receives said new node ID from said root device.

25. The system as claimed in claim 24, wherein said first device recognizes said new device based on said recognition signal and establishes a signal transmission channel with said new device.

26. The system as claimed in claim 25, wherein said recognition signal comprises a device type of said new device and a device manufacturer of said new device.

27. The system as claimed in claim 24, further comprising:

a second device connected to said network, wherein said root device assigns a second node ID to said second device and sends said second node ID to said second device, wherein said first node ID and said second node ID are sequential node addresses and are respectively assigned to said first device and said second device depending on an order in which said first device and second device request node IDs.

28. The system as claimed in claim 24, wherein said connection information comprises a device type of said new device and a device manufacturer of said new device.

29. The system as claimed in claim 24, wherein said root device and said first device are interconnected in said home network system via an IEEE 1394 bus.

30. A home network system, comprising:

a root device connected to a network via a network bus;

a first device connected to said network via said network bus;

a second device connected to said network via said network bus, wherein said root device assigns a first node ID to said first device, sends said first node ID to said first device, assigns a second node ID to said second device, and sends said second node ID to said second device, wherein said first node ID and said second node ID are sequential node addresses and are respectively assigned to said first device and said second device depending on an order in which said first device and second device request node IDs wherein said root device stores node information relating to said first node ID being assigned to said first device and said second node ID being assigned to said second device; and a new device that is connected to said network via said network bus after said root device stores said node information relating to said first node ID and said second node ID, wherein said new device sends connection information to said root device to inform said root device that said new device has been connected to said network via said network bus, wherein said root device assigns a new node ID to said new device without resetting said network bus and sends said new node ID to said new device, wherein said root device stores node information relating to said new node ID being assigned to said new device, and wherein said new device transmits a recognition signal comprising said new node ID to said first device and said second device.

31. The system as claimed in claim 30, wherein said first device and said second device recognize said new device based on said recognition signal and establish signal transmission channels with said new device.

32. The system as claimed in claim 31, wherein said connection information comprises a device type of said new device and a device manufacturer of said new device.

33. The system as claimed in claim 31, wherein said recognition signal comprises a device type of said new device and a device manufacturer of said new device.

34. A home network system, comprising
a root device connected to a network,
a first device connected to said network, and
a second device connected to said network, wherein said root system assigns a first node ID to said first device, sends said first node ID to said first device, assigns a second node ID to said second device, and sends said second node ID to said second device, wherein said root device stores node information relating to said first node ID being assigned to said first device and said second node ID being assigned to said second device,
wherein said second device is disconnected from said network after said node information relating to said first node ID and said second node ID is stored, and
wherein said first device sends a disconnection signal to said root device to inform said root device that said second device has been disconnected from said network.

35. The system as claimed in claim 34, further comprising:
a third device connected to said network, wherein said root device assigns a third node ID to said third device and sends said third node ID to said third device.

36. The system as claimed in claim 35, wherein said first node ID, said second node ID, and said third node ID are sequential node addresses and are respectively assigned to said first device, said second device, and said third device depending on an order in which said first device, said second device, and said third device request node IDs.

37. The system as claimed in claim 35, wherein said first device is located adjacent to said second device before said second device is disconnected from said home network system and sends said disconnection signal to said root device because said first device is located adjacent to said second device before said second device is disconnected.

38. The system as claimed in claim 35, wherein said root device transmits a disconnection notification signal to at least said third device to inform at least said third device that said second device has been disconnected from said home network system.

39. The system as claimed in claim 38, wherein said disconnection notification signal comprises said second node ID.

40. The method as claimed in claim 38, wherein at least said third device closes a signal transmission channel to said second device based on said disconnection notification signal.

41. A home network system, comprising:
a root device connected to a network;
a first device connected to said network;
a second device connected to said network; and
a third device connected to said network, wherein said root device assigns a first node ID to said first device, sends said first node ID to said first device, assigns a second node ID to said second device, sends said second node ID to said second device, assigns a third node ID to said third device, and sends said third node ID to said third device, wherein said root device stores node information relating to said first node ID being assigned to said first device, said second node ID being assigned to said second device, and said third node ID being assigned to said third device,
wherein said second device is disconnected from said network after said root device stores said node information relating to said first node ID, said second node ID, and said third node ID,
wherein said first device is located adjacent to said second device and sends a disconnection signal to said root device to inform said root device that said second device has been disconnected from said home network system because said first device is located adjacent to said second device before said second device is disconnected,
wherein said root device transmits a disconnection notification signal to at least said third device to inform at least said third device that said second device has been disconnected from said home network system, and
wherein at least said third device closes a signal transmission channel to said second device based on said disconnection notification signal.

42. The system as claimed in claim 41, wherein said first node ID, said second node ID, and said third node ID are sequential node addresses and are respectively assigned to said first device, said second device, and said third device depending on an order in which said first device, said second device, and said third device request node IDs.

43. The system as claimed in claim 41, wherein said disconnection notification signal comprises said second node ID.

* * * * *